(12) United States Patent
Sirianni et al.

(10) Patent No.: US 11,269,078 B1
(45) Date of Patent: Mar. 8, 2022

(54) SYSTEMS AND METHODS FOR DETECTING GLOBAL POSITIONING SYSTEM SPOOFING SIGNAL EMITTERS

(71) Applicant: ARCHITECTURE TECHNOLOGY CORPORATION, Eden Prairie, MN (US)

(72) Inventors: Joseph Sirianni, Eden Prairie, MN (US); Judson Powers, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 487 days.

(21) Appl. No.: 16/262,643

(22) Filed: Jan. 30, 2019

(51) Int. Cl.
*G01S 19/21* (2010.01)
*G01S 5/02* (2010.01)
*G01S 5/06* (2006.01)
*G01S 19/27* (2010.01)
*G01S 19/25* (2010.01)

(52) U.S. Cl.
CPC ........ *G01S 19/215* (2013.01); *G01S 5/02213* (2020.05); *G01S 5/06* (2013.01); *G01S 19/258* (2013.01); *G01S 19/27* (2013.01)

(58) Field of Classification Search
CPC . G01S 19/21–215; G01S 5/02213; G01S 5/06
See application file for complete search history.

(56) References Cited

U.S. PATENT DOCUMENTS

| | | | | |
|---|---|---|---|---|
| 7,847,734 B2* | 12/2010 | Wu | ........................ | G01S 5/0289 342/465 |
| 7,912,643 B1* | 3/2011 | Bean | ..................... | G01S 19/215 701/470 |
| 8,138,975 B2* | 3/2012 | Bull | ....................... | G01S 5/0215 342/450 |
| 8,446,310 B2* | 5/2013 | Law | ........................ | G01S 19/21 342/16 |
| 9,766,343 B2* | 9/2017 | Schleppe | .............. | G01S 19/215 |
| 10,162,060 B2* | 12/2018 | Jaeckle | ................. | G01S 19/215 |

FOREIGN PATENT DOCUMENTS

| | | | |
|---|---|---|---|
| CN | 106772456 A | * | 5/2017 |
| CN | 107064963 A | * | 8/2017 |

OTHER PUBLICATIONS

Joseph Sirianni, "Position Location of Transmitters"; Phase I SBIR Proposal: Topic Number and Name: A18-035 Detection and localization of GPS spoofing signal emitters, Architecture Technology Corporation, Feb. 7, 2018, 25 pages.

* cited by examiner

*Primary Examiner* — Cassi J Galt
(74) *Attorney, Agent, or Firm* — Foley & Lardner LLP (57) ABSTRACT

A system having a distributed node hardware and software product is disclosed. The distributed topology allows for multiple GPS receiver node positions. The multiple GPS receiver node positions enable an accurate location estimation of a GPS spoofing signal emitter source of an incoming malicious GPS signal. The system detects the presence of a GPS spoofing signal emitter with high confidence against any spoofing geometry or strategy while the GPS receiver nodes are on the move.

20 Claims, 4 Drawing Sheets

SYSTEMS AND METHODS FOR DETECTING GLOBAL POSITIONING SYSTEM SPOOFING SIGNAL EMITTERS

TECHNICAL FIELD

This application relates generally to field of a global positioning system (GPS), and more specifically to methods and apparatus for detecting and locating GPS spoofing signal emitters.

BACKGROUND

GPS technology provides satellite-based geolocation and navigation. More specifically, a GPS receiver anywhere on or near the earth can calculate its geolocation using GPS signals broadcasted from a subset GPS satellites. GPS technology, relying on the GPS satellite signal, does not require the user to transmit any data and operates independently of any telephonic or internet reception. Because the use of the GPS technology has become necessary for military, civilian, and commercial operations, it has also become a target for hackers.

Hackers can rely upon readily available and inexpensive GPS spoofing signal emitters to generate malicious (or spoofed) GPS signals. A GPS signal emitter may be, for example, a low cost software defined radio. A GPS receiver cannot distinguish between genuine GPS signals from the GPS satellites or malicious GPS signals from GPS spoofing signal emitters. Therefore, the GPS receiver can be tricked to calculate an incorrect geolocation. For example, using malicious GPS signals, a drone can be tricked to land on a hostile territory believing the hostile territory to be its home base.

Authentic GPS signals received on the earth have very low power due to a large distance between satellites orbits and a surface of the earth. The low power GPS signals makes easy for the GPS spoofing signal emitters to overpower legitimate GPS signal codes, causing the GPS receivers to receive and use spoofed radio waves. Thus, the GPS spoofing signal emitters have become an increasing threat to the GPS receivers. Various approaches have been used to detect the GPS spoofing signal emitters, but no single approach is able to efficiently detect and locate the GPS spoofing signal emitter. One approach to detect and locate the GPS spoofing signal emitter includes use of directional antennas, which are very expensive and large. Also, the directional antennas do not have proper sensitivity required to identify or locate the malicious GPS signals, and are therefore inefficient.

Additionally, the GPS signal codes are not encrypted, and therefore malicious actors are able to generate their own GPS signals using the GPS signal codes, which makes it simple to emulate the satellites. While some industries GPS signals and codes are encrypted, but there are still no measures to prevent replay of the GPS signals. The malicious actors are easily able to subvert the encryption of a first GPS code, and instead record a second GPS code that is transmitted by the satellites. The received GPS signals can then be easily replayed at different intervals to simulate any location at a time the GPS signals were recorded. While the GPS signals are still not generated on demand, but the attack on the industries using the GPS technology is easily performed using the malicious GPS signals.

SUMMARY

What is therefore needed is a distributed node network that detects fraudulent and malicious GPS signals to provide a defense against the malicious GPS signal attacks.

A distributed node network may perform time difference of arrival calculations of incoming GPS signals to detect and locate malicious GPS signal emitters. The position of the malicious GPS signal emitter is used to identify the fraudulent GPS signals and then prevent cyberattacks associated with the fraudulent GPS signals. The distributed node network operates with minimal space and energy requirements without the need for large and expensive antennas to track signals. The minimal footprint facilitates the distributed node network to be effortlessly deployed on various platforms such as robotic and industrial platforms.

In one embodiment, a method may include receiving, by a first node of a distributed node network, a signal containing a navigational message; the first node being at a first location; timestamping, by the first node, the navigational message to associate a first timestamp of a time of arrival of the navigational message at the first node; parsing, by the first node, ephemeris information from the navigational message; receiving, by the first node from a second node of the distributed node network, a second timestamp of a time of arrival of the navigational message at the second node and a second location of the second node; receiving, by the first node from a third node of the distributed node network, a third timestamp of a time of arrival of the navigational message at the third node and a third location of the third node; calculating, by the first node, a time difference of arrival of the navigational message based upon the first, second, and third timestamps and the first, the second, and third locations; determining, by the first node, a location of the source for the signal based upon the time difference of arrival of the navigational message; and determining, by the first node, whether the signal was transmitted from a global positioning system (GPS) satellite based upon the determined location of the source of the signal and ephemeris information parsed from the navigational message.

In another embodiment, a system may include a first node of a distributed node network configured to receive a signal containing a navigational message; the first node being at a first location; timestamp the navigational message to associate a first timestamp of a time of arrival of the navigational message at the first node; parse ephemeris information from the navigational message; receive from a second node of the distributed node network, a second timestamp of a time of arrival of the navigational message at the second node and a second location of the second node; receive from a third node of the distributed node network, a third timestamp of a time of arrival of the navigational message at the third node and a third location of the third node; calculate a time difference of arrival of the navigational message based upon the first, second, and third timestamps and the first, the second, and third locations; determine, by the first node, a location of the source for the signal based upon the time difference of arrival of the navigational message; and determine, by the first node, whether the signal was transmitted from a global positioning system (GPS) satellite based upon the determined location of the source of the signal and ephemeris information parsed from the navigational message.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments in the drawings, which form a part here. Other embodiments may be used and/or other changes may be made without departing from the spirit or scope of the present disclosure. The embodiments described in the detailed description are not meant to be limiting of the subject matter presented here.

A system described herein is a distributed node hardware and software product. The system may detect a presence of a GPS spoofing signal emitter with high confidence against any spoofing geometry or strategy while GPS receivers are on the move. Unlike conventional GPS spoofing signal emitter identification techniques that use expensive antenna arrays to detect GPS signals direction of arrival, the system uses a distributed set of inexpensive hardware nodes and software products to rapidly and precisely detect and locate a malicious GPS spoofing signal emitter. The distributed topology of the system allows for multiple GPS receiver positions to make accurate location estimation of a source of an incoming signal. The system may be implemented in various sectors such as military, government, and commercial sectors, for different software, hardware, and underlying technology.

The system may provide a mesh network topology for dynamic movement of the nodes, and self-healing for the nodes that move in and out of a communication range. The nodes may measure a distance from a GPS spoofing signal emitter source emitting GPS signals. The distance may be accurately measured using a time difference of arrival technique. The time difference of arrival technique is a technique for the GPS spoofing signal emitter source geolocation, using three or more GPS receiver nodes, with algorithms to locate the GPS spoofing signal emitter source from the different arrival times at the GPS receiver nodes. With accurate measurements of the distances between three or more synchronized GPS receiver nodes, the location of the GPS spoofing signal emitter source is estimated by multilateration. The nodes may execute the time difference of arrival technique, and capable of: 1) detecting a presence of a corrupted GPS output due to the GPS spoofing signal emitter source, 2) determining a location of the GPS spoofing signal emitter source, and 3) extending a solution to multiple GPS spoofing signal emitters.

Figure 1:
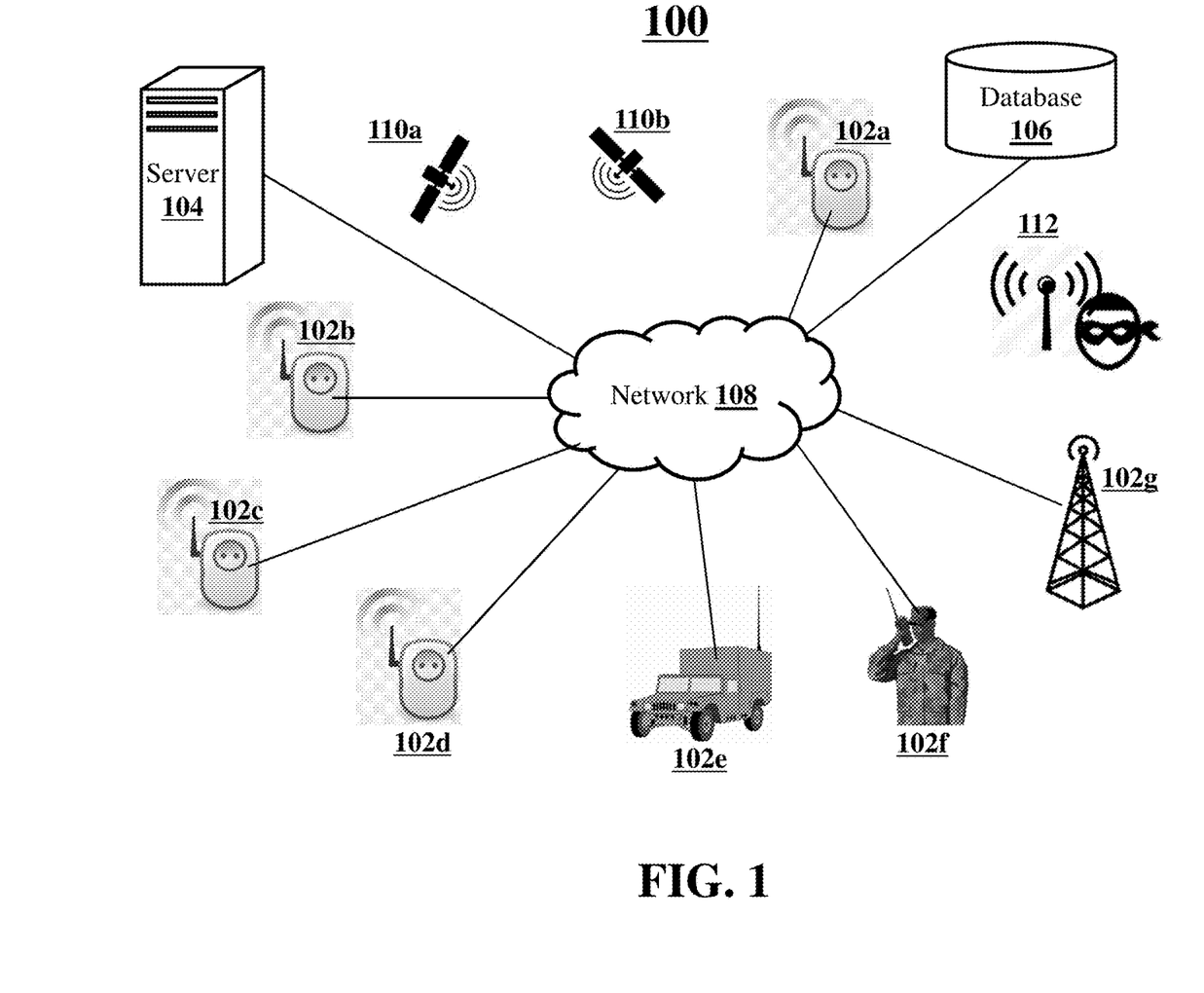
FIG. 1 illustrates a system for detecting and locating GPS spoofing signal emitters, according to an embodiment.

FIG. 1 illustrates a system 100 for detecting and locating GPS spoofing signal emitters. The system 100 may include distributed nodes 102a-102g (collectively or commonly referred to as 102), a server 104, and a database 106. The nodes 102 may be GPS receivers. The GPS receivers may be mobile receivers and stationary receivers. The receivers may be wired or wireless receivers, which may receive signals from GPS satellites 110a, 110b (commonly and collectively referred to as 110), as well as GPS spoofing signal emitters, such as GPS spoofing signal emitter 112.

The system 100 may operate in a cloud-computing environment. A processor of each node 102 may be cloud-optimized, and communicate incoming signal data (from GPS satellites 110 and the GPS spoofing signal emitter 112) associated with various navigation and location based tasks with a processor of other nodes 102 and the server 104. The signal data may include a navigation message. The navigation message may be a continuous data stream modulated via a spread spectrum sequence onto the carrier signal of each satellite. The navigation message may be a telemetry message transmitted in frames. The frame may be n bits long, and takes a predetermine amount of time (for example, in seconds) to be transmitted. Every satellite (e.g., GPS satellites 110) may start transmission of a frame according to its own clock. Each frame may include several sub frames.

The nodes 102, the server 104, and the database 106 may communicate to each other through a network 108. The examples of the network 108 may include, but are not limited to, private or public LAN, WLAN, MAN, WAN, ad hoc network, and the Internet. The network 108 may further include both wired and wireless communications according to one or more standards and/or via one or more transport mediums. The communication over the network 108 may be performed in accordance with various communication protocols such as Transmission Control Protocol and Internet Protocol (TCP/IP), User Datagram Protocol (UDP), and IEEE communication protocols. In one example, the network 108 may include wireless communications according to Bluetooth specification sets, or another standard or proprietary wireless communication protocol. In another example, the network 108 may also include communications over a cellular network, including, e.g. a GSM (Global System for Mobile Communications), CDMA (Code Division Multiple Access), and EDGE (Enhanced Data for Global Evolution) network.

As described above, each node 102 may be a GPS receiver. A GPS receiver may be a device that is capable of receiving signals from the GPS satellites 110 and the GPS spoofing signal emitter 112. A processor associated with the GPS receiver may process the received signal, and calculate a geographical position of the GPS receiver. The processor may include logic, circuitry, and interfaces that are operable to execute one or more instructions to perform processing of the signal data. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. Support circuits for the processor may include cache, power supplies, clock circuits, data registers, and I/O interfaces. The I/O interface may be directly coupled to a memory or coupled through the processor. The memory may store output of the processed signal. Using a software application, the GPS receiver may further display its position on a map and offer directions. The GPS receiver may include a graphics processing unit that executes a set of instructions to display its position.

A first GPS receiver may be located at a first location. The first GPS receiver may receive a signal from the GPS satellite 110 or a GPS spoofing signal emitter 112. The first GPS receiver may include multiple processors such as a first processor and a second processor. The first processor of the first GPS receiver may process the signal to extract a navigational message contained in the signal. The navigation message may be a continuous data stream modulated via a spread spectrum sequence onto the carrier signal of a source satellite. The navigation message may be transmitted in frames. The frame may be n bits long, and takes a predetermine amount of time (for example, in seconds) to be transmitted to the first GPS receiver. The navigational message may include information such as ephemeris information of the GPS satellite that generated that navigational message. The first GPS receiver may timestamp the navigational message to generate a first timestamp. The first timestamp is the timestamp of a time of arrival of the navigational message at the first GPS receiver. The first GPS receiver may store the first timestamp and the navigational message in a local database or the database 106.

The processor of the first GPS receiver may further process the navigational message. Initially, the processor of the first GPS receiver may retrieve the navigational message from the database 106, and then the process information within the navigational message. For instance, the processor of the first GPS receiver may parse ephemeris information from the navigational message. The ephemeris information may include a position of the GPS satellite that generated the navigational message.

A second GPS receiver may be located at a second location. The second GPS receiver may receive a signal from the GPS satellite 110 or a GPS spoofing signal emitter 112. The second GPS receiver may include multiple processors such as a first processor and a second processor. The first processor of the second GPS receiver may process the signal to extract a navigational message contained in the signal. The navigation message may be a continuous data stream modulated via a spread spectrum sequence onto the carrier signal of a source satellite. The navigation message may be transmitted in frames. The frame may be n bits long, and takes a predetermine amount of time (for example, in seconds) to be transmitted to the second GPS receiver. The second GPS receiver may timestamp the navigational message to generate a second timestamp. The second timestamp is the timestamp of a time of arrival of the navigational message at the second GPS receiver. The second GPS receiver may store the second timestamp and the navigational message in a local database or in the database 106.

A third GPS receiver may be located at a third location. The third GPS receiver may receive a signal may receive a signal from the GPS satellite 110 or a GPS spoofing signal emitter 112. The third GPS receiver may include multiple processors such as a first processor and a second processor. The first processor of the third GPS receiver may process the signal to extract a navigational message contained in the signal. The navigation message may be a continuous data stream modulated via a spread spectrum sequence onto the carrier signal of a source satellite. The navigation message may be transmitted in frames. The frame may be n bits long, and takes a predetermine amount of time (for example, in seconds) to be transmitted to the third GPS receiver. The third GPS receiver may timestamp the navigational message to generate a third timestamp. The third timestamp is the timestamp of a time of arrival of the navigational message at the third GPS receiver. The third GPS receiver may store the third timestamp and the navigational message in a local database or database 106.

In operation, the first GPS receiver, the second GPS receiver, and the third GPS receiver are connected through the mobile ad hoc network 108. The first GPS receiver may receive a GPS signal and may process the signal to extract the navigational message within the GPS signal. The first GPS receiver may timestamp the navigational message to generate a first timestamp. The first GPS receiver may parse out ephemeris information from the navigational message. The second GPS receiver may receive and process the GPS signal to extract the navigational message within the signal. The second GPS receiver may timestamp the navigational message to generate a second timestamp. The second GPS receiver may transmit the second timestamp to the first GPS receiver.

The third GPS receiver may receive the GPS signal and process the G{S signal to extract the navigational message within the signal. The third GPS receiver may timestamp the navigational message to generate a third timestamp. The third GPS receiver may transmit the third timestamp to the first GPS receiver.

On receiving all the timestamps, the first GPS receiver may calculate a time difference of arrival of the navigational message based upon the first timestamp, the second timestamp, and the third timestamp. In alternate embodiments, the first GPS receiver may calculate the time difference of arrival of the navigational message based upon the first timestamp, the second timestamp, and the third timestamp along with information associated with the first location, the second location, and the third location. The first GPS receiver may then determine a location of the source for the signal using the information associated with the time difference of arrival of the navigational message. The determined location of the source may be an absolute location. The absolute location may include information associated with latitude and longitude of the source. The determined location of the source maybe a relative location. For example, the location of the source is relative to at least of the first location, the second location, and the third location. The relative location may be expressed in terms of distance, travel time, or cost.

Upon determining the location of the source, the first GPS receiver may determine whether the source is the GPS satellite 110. The first GPS receiver may process information associated with the determined location of the source along with the ephemeris information parsed from the navigational message to determine whether the signal was transmitted from the GPS satellite 110. During the processing operation, the first GPS receiver may match the determined location of the source with the ephemeris information. When the determined location of the source of signal matches the ephemeris information, the first GPS receiver may conclude that the signal is transmitted from the GPS satellite 110. When the determined location of the source does not match the ephemeris information, the first GPS receiver may conclude that the signal is not transmitted from the GPS satellite 110. In alternate embodiments, the first GPS receiver may match the ephemeris information with a known GPS satellite observed from the first location. When the ephemeris information matches the known GPS satellite location, the first GPS receiver may determine that the signal is transmitted from the GPS satellite 110. When the ephemeris information does not match the known GPS satellite, the first GPS receiver may determine that the signal is not transmitted from the GPS satellite 110.

A server 104 may communicate with the nodes 102 and the database 106. The server 104 may receive signal or other data from the one or more nodes 102 for further processing. The server 104 may process the signal or other data. The server 104 may store the output of the processing operation of the signal or other data in the database 106. The server 104 may be a computing device comprising a processor and non-transitory machine-readable storage capable of executing various tasks and processes described herein. Non-limiting examples of the computing devices may include workstation computers, laptop computers, server computers, laptop computers, and the like. While the system 100 includes a single server 104, in some embodiments the system 100 may include any number of server computing devices operating in a distributed computing environment.

In operation, the server 104 may receive information associated with timestamps and location of each node 102 from at least one node 102. The server 104 may then calculate a time difference of arrival of a navigational message based upon the various timestamps along with information associated with the locations. The server 104 may determine a location of the source for the signal using the information associated with the time difference of arrival of the navigational message. The server 104 may determine whether the source is a GPS satellite 110. The server 104 may match the determined location of the source with the ephemeris information. When the determined location of the source of signal matches the ephemeris information, the server 104 receiver may conclude that the signal is transmitted from the GPS satellite 110. When the determined location of the source does not match the ephemeris information, the server 104 may conclude that the signal is not transmitted from the GPS satellite 110. The server 104 may transmit its output regarding whether the source is a GPS satellite 110 to the at least one node 102.

A database 106 may store a set of instructions, signal data, timestamps, and navigation messages. The database 106 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. The database 106 may further include one or more instructions that are executable by a processor associated with the nodes 102 and the server 104 to perform signal processing tasks.

Figure 2A:
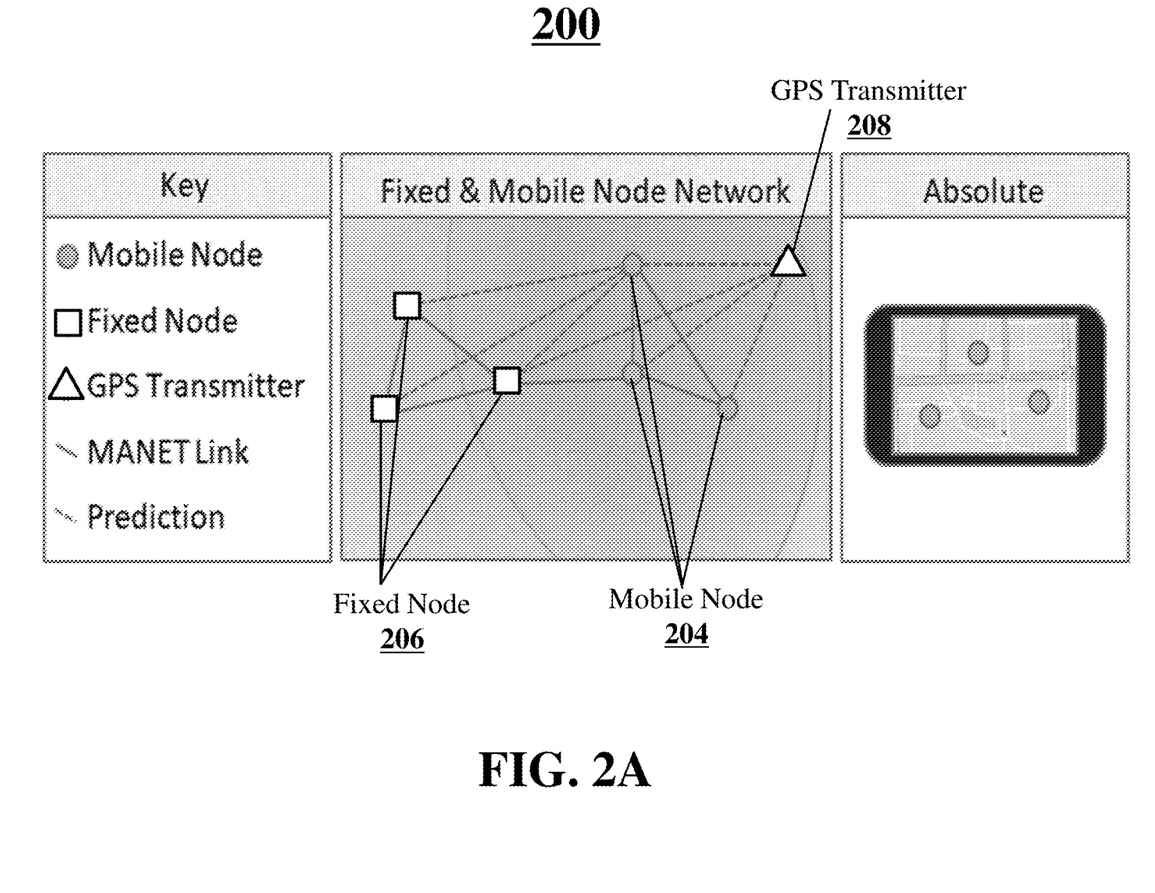
FIG. 2A illustrates a block diagram of a system for detecting and locating GPS spoofing signal emitters operating in a first mode, according to an embodiment.

FIG. 2A illustrates a block diagram of a system 200 for detecting and locating GPS spoofing signal emitters operating in a first mode. The first mode is an absolute location mode. The operation in the first mode may result in determination of a geolocation of a GPS spoofing signal emitter 208. The geolocation coordinates may be useful for navigation and visualization of a threat associated with the GPS spoofing signal emitter 208 from satellite imagery. The geolocation coordinates may include latitude, longitude, and altitude of the GPS spoofing signal emitter 208.

In operation, at least three fixed nodes 206 may be placed at different fixed locations. The fixed nodes 206 are synchronized. The fixed nodes 206 may process incoming signal data to identify the location of the GPS spoofing signal emitter 208 and mobile nodes 204. The fixed nodes 206 may identify the location of the GPS spoofing signal emitter 208 and the mobile nodes 204 at the same time. The fixed nodes 206 may execute a multilateration technique for processing the incoming signal data to simultaneously locate the GPS spoofing signal emitter 208 and the mobile nodes 204. The execution of the multilateration technique may facilitate the determination of the location of the GPS spoofing signal emitter 208 and the mobile nodes 204 by measuring a time difference of arrival of the signal at three or more fixed nodes 206. Upon the end of the multilateration technique execution, the location of the GPS spoofing signal emitter 208 and the mobile nodes 204 are determined. Once the location of the mobile nodes 204 is determined, the mobile nodes 204 may be deployed in remote locations. The process of locating the mobile nodes 204 may increase a number of readings and reduce calculation errors while estimating the absolute location of the GPS spoofing signal emitter 208.

Figure 2B:
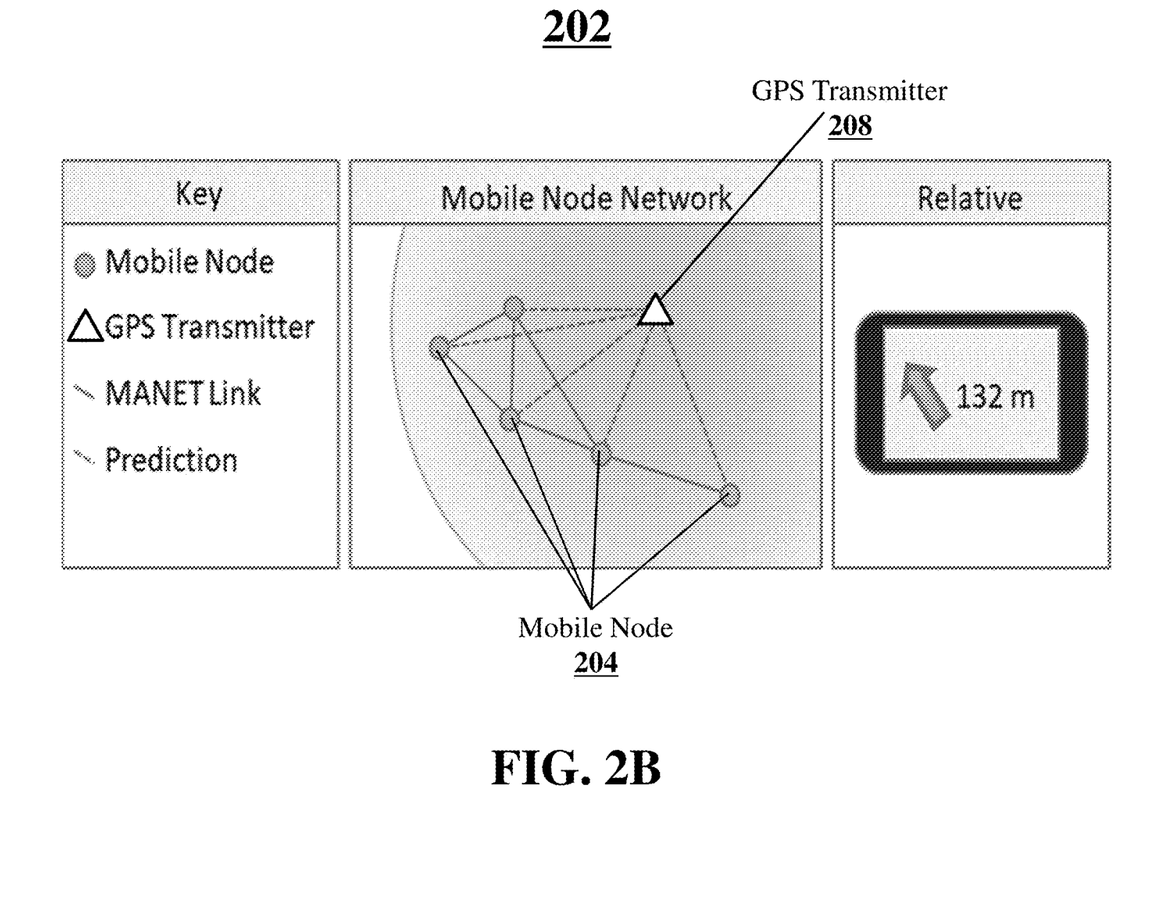
FIG. 2B illustrates a block diagram of a system for detecting and locating GPS spoofing signal emitters operating in a second mode, according to an embodiment.

FIG. 2B illustrates a block diagram of a system 202 for detecting and locating GPS spoofing signal emitters operating in a second mode. The second mode is a relative location mode where the location of the GPS spoofing signal emitter 208 is determined when there is no setup of the fixed nodes. The location of the mobile nodes 204 is used to determine the relative location of the GPS spoofing signal emitter 208. For instance, an estimated relative location of the GPS spoofing signal emitter 208 is provided by way of direction and distance for each mobile node 204 to the GPS spoofing signal emitter 208.

In operation, each mobile node 204 may receive a signal. Each mobile node 204 may record a ledger for each incoming signal stamped with a time of arrival of the signal and its current location. A processor associated with one mobile node 204 may then disseminate all the ledgers associated with the incoming signals to calculate a time difference of arrival of the signal at the mobile node 204 with relation to other mobile node 204, and then locate the GPS spoofing signal emitter 208 using multilateration. This process enables the mobile nodes 204 to operate without high-resolution time synchronization when the GPS spoofing signal emitter 208 is illegitimate. The process also reduces an impact of a clock drift since the time difference of arrival of the signal at one mobile node 204 is relative to neighboring signals received on other mobile nodes 204.

Figure 3:
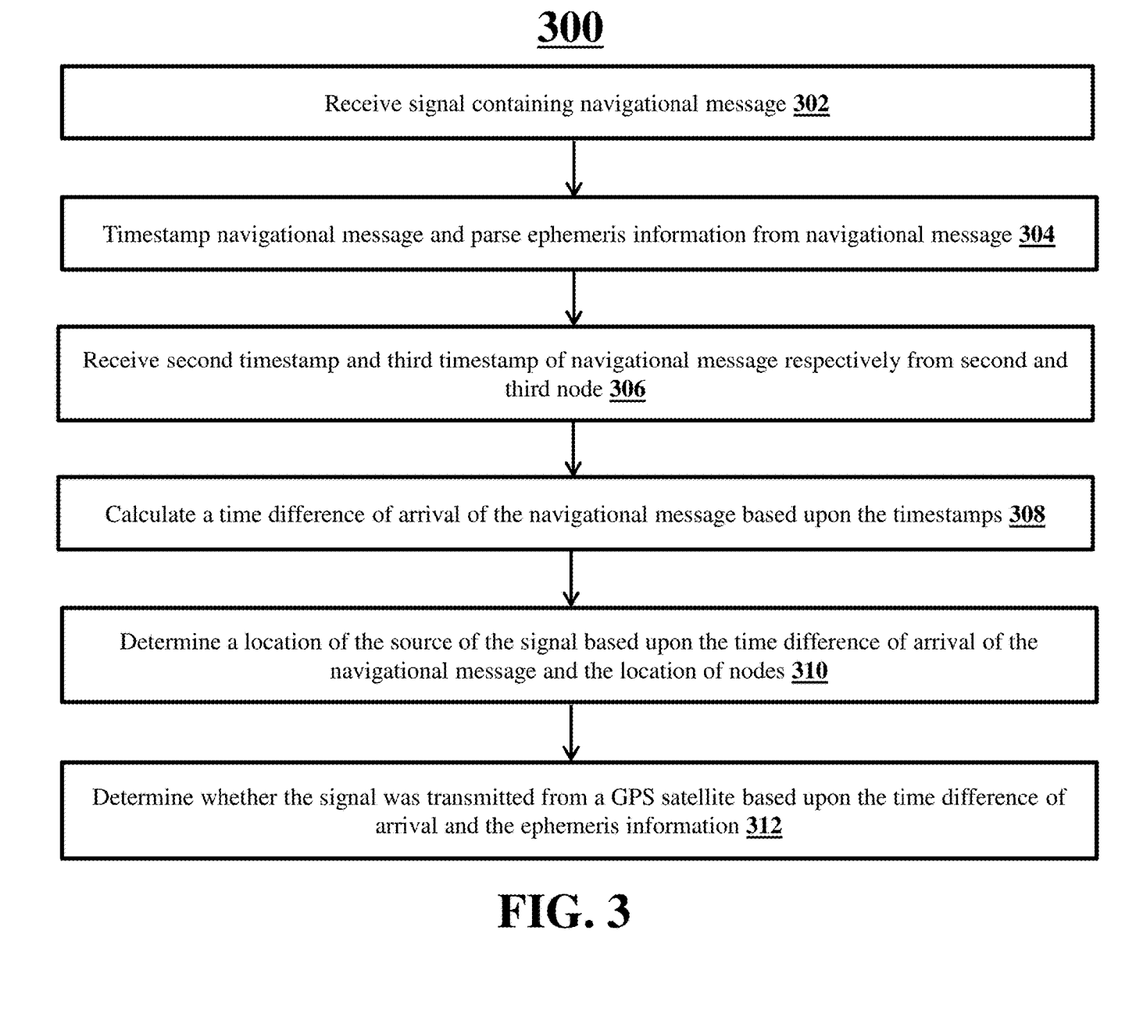
FIG. 3 illustrates a method for detecting and locating GPS spoofing signal emitters, according to an embodiment.

FIG. 3 shows execution of a method for detecting GPS spoofing signal emitters, according to a method 300. The method 300 shown in FIG. 3 comprises execution steps 302, 304, 306, 308, 310, and 312. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of the FIG. 3 is described as being executed by a single node in this embodiment. However, one having skill in the art will appreciate that, in some embodiments, steps may be executed by any number of nodes operating in a distributed node network environment. In some cases, a node executing one or more steps may be programmed to execute various other, unrelated features, where such node does not need to be operating strictly as a first node described herein.

In a first step 302, a first node may be located at a first location. The first node maybe a software defined node. The first node maybe a stationary node. The first node maybe a mobile node. In operation, the first node may receive a signal containing a navigational message over a network.

In a next step 304, a first node may timestamp the navigational message to associate a first timestamp of a time of arrival of the navigational message at the first node. The navigational message may include information such as ephemeris information of the GPS satellite that generated that navigational message. For example, if the navigational message is received at 13:00 hours on Jan. 1, 1999, then the first node assigns a timestamp of 13:00 hours on Jan. 1, 1999 on the navigational message. The first node may store the timestamp and the navigational message in a database.

The first node may process the navigational message. During the processing operation, the first node may parse ephemeris information from the navigational message. The ephemeris information may include the positions of naturally occurring astronomical objects as well as satellites in the sky at a given time or times. For instance, the satellites transmit information about their location (current and predicted) and timing via the ephemeris information. The first node may use the ephemeris information to estimate location relative to the satellites, and thus position on the earth. The ephemeris information may also be used to predict future satellite conditions (for a given place and time) providing a tool for planning when (or when not) to schedule the GPS data collection.

In a next step 306, a first node may receive a notification from a second node. The second node may be located at a second location. The second node maybe a software defined node. The second node maybe a stationary node. The second node maybe a mobile node. In operation, the second node may receive a signal containing a navigational message over a network. The second node may timestamp the navigational message to associate a second timestamp of a time of arrival of the navigational message at the second node. For example, if the navigational message is received at 14:00 hours on Jan. 1, 1999, then the second node assigns a timestamp of 14:00 hours on Jan. 1, 1999 on the navigational message. The second node may store the timestamp and the navigational message in the database. The second node may then generate the notification containing information associated with the second timestamp of the time of arrival of the navigational message at the second node and the second location of the second node. The second node may transmit the notification to the first node over the network.

The first node may receive a notification from a third node. The third node may be located at a third location. The third node maybe a software defined node. The third node maybe a stationary node. The third node maybe a mobile node. In operation, the third node may receive a signal containing a navigational message over a network. The third node may timestamp the navigational message to associate a third timestamp of a time of arrival of the navigational message at the third node. For example, if the navigational message is received at 15:00 hours on Jan. 1, 1999, then the second node assigns a timestamp of 15:00 hours on Jan. 1, 1999 on the navigational message. The third node may store the timestamp and the navigational message in the database. The third node may then generate the notification containing information associated with the third timestamp of the time of arrival of the navigational message at the third node and the third location of the third node. The third node may transmit the notification to the first node over the network.

In a next step 308, a first node may calculate a time difference of arrival of the navigational message based upon the first timestamp, the second timestamp, and the third timestamp. In some cases, the first node may calculate a time difference of arrival of the navigational message based upon the first timestamp, the second timestamp, and the third timestamp along with information associated with the first location, the second location, and the third location.

In a next step 310, a first node may determine a location of a source for the signal containing the navigational message. The first node may use information associated with the time difference of arrival of the navigational message to determine the location of the source for the signal. The location of the source of the signal is an absolute location. The absolute location is a description of the exact site on the source coordinate system based on a fixed point on earth. When referring to a map or the Earth's surface, the absolute location is the latitude and longitude of a specific source.

The lines of longitude and latitude crisscross the earth. The location of the source of the signal may be a relative location. The relative location refers to the position of a source based on its location with respect to other locations. For example, the location of the source is relative to at least of the first location, the second location, and the third location. The relative location can be expressed in terms of distance, travel time, or cost.

In a next step 312, a first node may determine whether the signal was transmitted from a GPS satellite. The first node may process information associated with the determined location of the source of the signal and the ephemeris information parsed from the navigational message to determine whether the signal was transmitted from the GPS satellite.

In one embodiment, during the processing, the first node may match the location of the source of signal with the ephemeris information parsed from the navigational message. When the location of the source of signal matches the ephemeris information parsed from the navigational message, the first node may determine that the signal is transmitted from the GPS satellite. When the location of the source of signal does not match the ephemeris information parsed from the navigational message, the first node may determine that the signal is not transmitted from the GPS satellite.

In another embodiment, during the processing, the first node may match the ephemeris information parsed from the navigational message with a known GPS satellite observed from the first location. When the ephemeris information parsed from the navigational message matches the known GPS satellite observed from the first location, the first node may determine that the signal is transmitted from the GPS satellite. When the ephemeris information parsed from the navigational message does not match the known GPS satellite observed from the first location, the first node may determine that the signal is not transmitted from the GPS satellite.

The first node may determine that whether the signal is transmitted from a fourth node. The first node may process information associated with the location of the source of the signal and the ephemeris information parsed from the navigational message. Using the output of the processing, the first node may determine whether the signal is transmitted from the fourth node.

The first node, the second node, the third node, and the fourth node maybe connected through a mobile ad hoc network. The mobile ad hoc network may be a wireless ad hoc network, which is a continuously self-configuring, infrastructure-less network of mobile and electronic devices connected wirelessly. Each node device in the mobile ad hoc network is free to move independently in any direction, and will therefore change its links to other node devices frequently.

Example

A trucking company may use driverless trucks for freight delivery across the country. The driverless trucks may use GPS navigation devices that rely upon GPS signals for geolocation. However, an attacker may maliciously plant cheap software defined radios at an intersection to divert the trucks into a different location for freight theft. To counter this attack, the trucking company may maintain a distributed node network containing GPS nodes (also referred to as nodes). The trucking company may have stationary nodes installed at various locations on the highway (e.g., at utility poles, at highway signs). The trucking company may also have mobile nodes, e.g., deployed using drones. Furthermore, the GPS navigation devices in the truck may also function as nodes. Each node is configured to receive GPS signals and communicate with other nodes. In the distributed network node, each node calculates TDOA of a GPS signal it has received compared to other nearby nodes. Each node also extract ephemeris information of each GPS signal it receives. Using the TDOA calculation and the ephemeris information, the distributed network node may identify a malicious GPS signals coming in from devices used to attack the freight delivery trucks and generate alerts for automated or human intervention.

The foregoing method descriptions and the process flow diagrams are provided merely as examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a first node of a distributed node network, a signal containing a navigational message, the first node being at a first location;
timestamping, by the first node, the navigational message to associate a first timestamp of a time of arrival of the navigational message at the first node;
parsing, by the first node, ephemeris information from the navigational message;
receiving, by the first node from a second node of the distributed node network, a second timestamp of a time of arrival of the navigational message at the second node and a second location of the second node;
receiving, by the first node from a third node of the distributed node network, a third timestamp of a time of arrival of the navigational message at the third node and a third location of the third node;

calculating, by the first node, a first time difference of arrival of the navigational message based upon the first and second timestamps and a second time difference of arrival of the navigational message based upon the first and third timestamps;

determining, by the first node, a relative location of a source for the signal based upon the first and second time difference of arrival of the navigational message using multilateration, wherein the relative location is a location relative to at least of the first location, the second location, and the third location, and wherein the relative location is expressed as a distance or travel time from said at least one location; and determining, by the first node, whether the signal was transmitted from a global positioning system (GPS) satellite based upon the determined relative location of the source of the signal and the ephemeris information parsed from the navigational message.

2. The computer-implemented method according to claim 1, wherein at least one of the first, the second, and third node is a software defined node.

3. The computer-implemented method according to claim 1, wherein at least one of the first, the second, and third node is a stationary node.

4. The computer-implemented method according to claim 1, wherein at least one of the first, the second, and third node is a mobile node.

5. The computer-implemented method according to claim 1, further comprising determining, by the first node, an absolute location of the source for the signal.

6. The computer-implemented method according to claim 1, further comprising:
determining, by the first node, that the signal is transmitted from a GPS satellite in response to determining that the relative location of the source of signal matches the ephemeris information parsed from the navigational message; and
determining, by the first node, that the signal is not transmitted from a GPS satellite in response to determining that the relative location of the source of the signal does not match the ephemeris information parsed from the navigational message.

7. The computer-implemented method according to claim 1, further comprising:
determining, by the first node, that the signal is transmitted from a GPS satellite in response to determining ephemeris information parsed from the navigational message matches a known GPS satellite observed from the first location; and
determining, by the first node, that the signal is not transmitted from a GPS satellite in response to determining ephemeris information parsed from the navigational message does not match a known GPS satellite observed from the first location.

8. The computer-implemented method according to claim 1, further comprising:
determining, by the first node, that the signal is transmitted from a fourth node based upon the determined relative location of the source of the signal and ephemeris information parsed from the navigational message.

9. The computer-implemented method according to claim 1, wherein the first, the second, and third nodes are connected through a mobile ad hoc network.

10. A system comprising:
a distributed node network comprising a first node, a second node, and a third node;
the first node configured to:
receive a signal containing a navigational message; the first node being at a first location;
timestamp the navigational message to associate a first timestamp of a time of arrival of the navigational message at the first node;
parse ephemeris information from the navigational message;
receive from the second node, a second timestamp of a time of arrival of the navigational message at the second node and a second location of the second node;
receive from the third node, a third timestamp of a time of arrival of the navigational message at the third node and a third location of the third node;
calculate a first time difference of arrival of the navigational message based upon the first and second timestamps and a second time difference of arrival of the navigational message based upon the first and third timestamps;
determine a relative location of a source for the signal based upon the first and second time difference of arrival of the navigational message using multilateration, wherein the relative location is a location relative to at least of the first location, the second location, and the third location, and wherein the relative location is expressed as a distance or travel time from said at least one location; and
determine whether the signal was transmitted from a global positioning system (GPS) satellite based upon the determined relative location of the source of the signal and the ephemeris information parsed from the navigational message.

11. The system according to claim 10, wherein at least one of the first, the second, and third node is a software defined node.

12. The system according to claim 10, wherein at least one of the first, the second, and third node is a stationary node.

13. The system according to claim 10, wherein at least one of the first, the second, and third node is a mobile node.

14. The system according to claim 10, wherein the first node is further configured to determine an absolute location of the source for the signal.

15. The system according to claim 10, wherein the first node is further configured to:
determine that the signal is transmitted from a GPS satellite in response to determining that the relative location of the source of signal matches the ephemeris information parsed from the navigational message; and
determine that the signal is not transmitted from a GPS satellite in response to determining that the relative location of the source of the signal does not match the ephemeris information parsed from the navigational message.

16. The system according to claim 10, wherein the first node is further configured to:
determine that the signal is transmitted from a GPS satellite in response to determining ephemeris information parsed from the navigational message matches a known GPS satellite observed from the first location; and
determine that the signal is not transmitted from a GPS satellite in response to determining ephemeris information parsed from the navigational message does not match a known GPS satellite observed from the first location.

17. The system according to claim 10, wherein the system comprises a fourth node and wherein the first node is further configured to:
- determine that the signal is transmitted from the fourth node based upon the determined relative location of the source of the signal and ephemeris information parsed from the navigational message.

18. The system according to claim 10, wherein the first, the second, and third nodes are connected through a mobile ad hoc network.

19. The method according to claim 5, wherein the absolute location of the source for the signal comprises a latitude and longitude.

20. The system according to claim 14, wherein the absolute location of the source for the signal comprises a latitude and longitude.

* * * * *